United States Patent Office 2,814,874
Patented Dec. 3, 1957

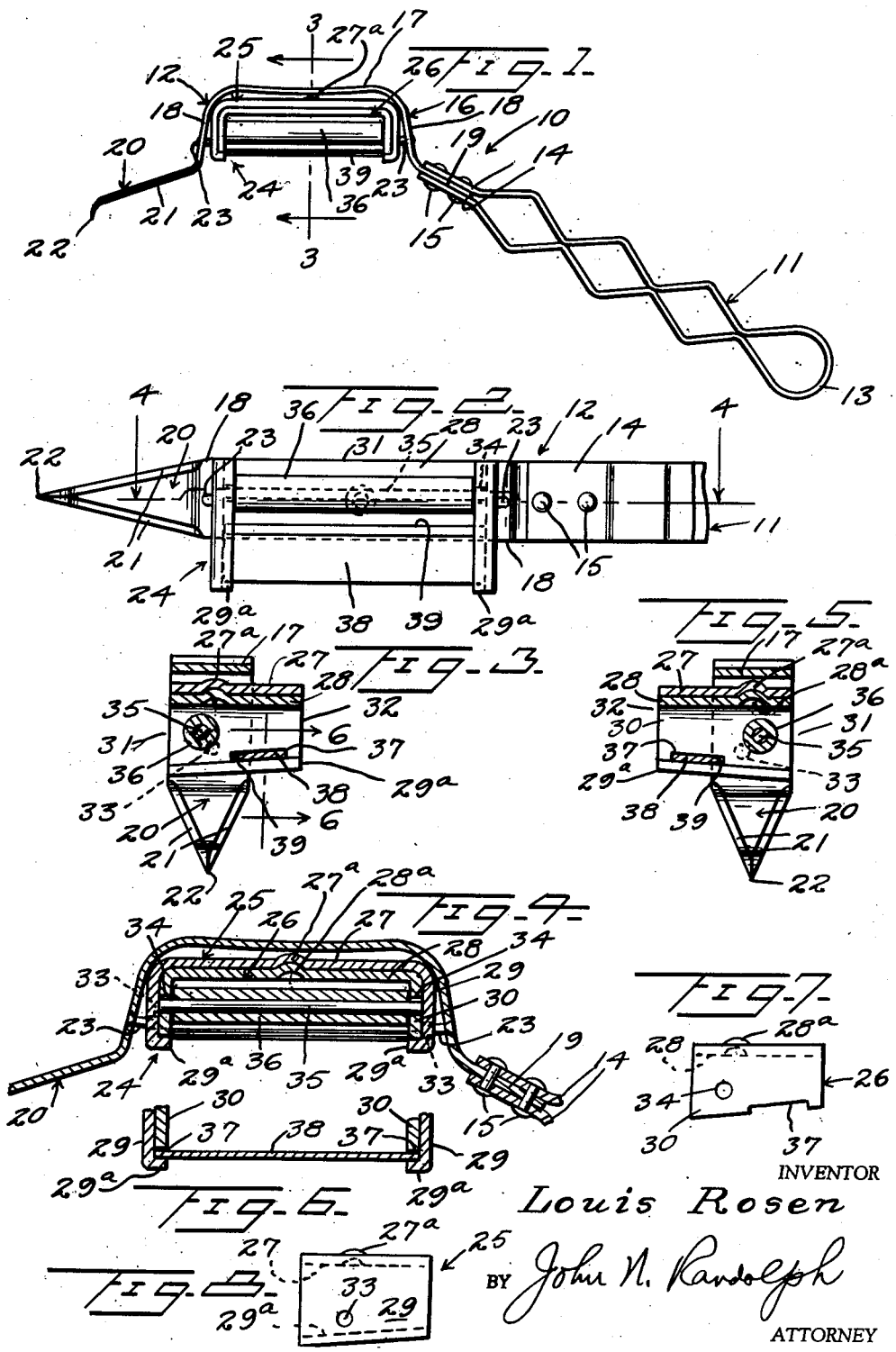

2,814,874
PEELING IMPLEMENT
Louis Rosen, Daytona Beach, Fla.
Application December 12, 1955, Serial No. 552,316
3 Claims. (Cl. 30—278)

This invention relates to a novel implement for peeling vegetables and fruits such as potatoes, carrots, cucumbers, apples and pears.

More particularly, it is an aim of the present invention to provide a peeling implement including a swingably supported blade, the angle of the plane of which will be adjusted automatically relative to the handle of the implement for most effectively accomplishing its peeling operation.

Another object of the invention is to provide a peeler including gauge means for regulating the cutting depth of the blade and which is supported for swinging movement with the blade.

A further object of the invention is to provide a peeler including a readily detachable blade holder enabling ready replacement of a dull blade and permitting reversal of the position of the blade holder in the implement to enable use of the implement with equal ease when grasped in either the right or the left hand.

Still another object of the invention is to provide a peeling implement having a blade which is especially well adapted for peeling the ends of vegetables and fruit and for removing the eyes from potatoes and imperfections from the surfaces of other vegetables and fruit.

Still a further object of the invention is to provide a peeling implement the gauge means of which may be removed and replaced to enable the use of gauges by which the cutting depth of the blade may be varied.

Various other objects and advantages of the invention will hereinafter become more fully apparent from the following description of the drawing illustrating a presently preferred embodiment thereof, and wherein:

Figure 1 is a side elevational view of the peeling implement, looking toward the front of the blade holder;

Figure 2 is an enlarged fragmentary bottom plan view thereof;

Figure 3 is an enlarged cross sectional view taken substantially along a plane as indicated by the line 3—3 of Figure 1;

Figure 4 is a longitudinal sectional view, taken substantially along a plane as indicated by the line 4—4 of Figure 2;

Figure 5 is a cross sectional view corresponding to Figure 3 but showing the blade holder in a reversed position, relative to Figure 3;

Figure 6 is a fragmentary longitudinal sectional view, taken substantially along a plane as indicated by the line 6—6 of Figure 3;

Figure 7 is an end elevational view of the inner section of the blade holder, and Figure 8 is an end elevational view of the outer section of said holder.

Referring more specifically to the drawing, the peeling implement in its entirety and comprising the invention is designated generally 10 and includes an elongated handle 11 and an elongated handle extension or frame 12. The handle 11 is formed of an elongated strip of relative heavy gauge metal which is folded back upon itself intermediate of its ends to provide a loop 13 at the outer end of said handle capable of engaging a nail, hook or other support, not shown, from which the implement 10 can be suspended when not in use. The other end of the handle 11, formed by the two ends 14 of the handle forming strip, receive therebetween an end of the frame 12 which is secured to the handle 11 by suitable fastenings 15, such as rivets, which extend through said frame end and through the parts 14. The complementary portions of the handle forming strip between the loop 13 and said ends 14 are fluted transversely of the handle to provide a corrugated-like grip portion which can be conveniently grasped and securely held by the hand of the user.

Whereas the material forming the handle 11 is relatively thick and stiff so that said handle is substantially rigid, the frame 12 is formed by an elongated strip of a lighter gauge metal which is relatively resilient, such as spring steel. Said strip forming the frame or handle extension 12 includes a substantially arch shaped intermediate portion, designated generally 16, having an elongated intermediate or top part 17, the intermediate part of which is downwardly bowed slightly, and complementary downwardly extending end portions 18 which are disposed in downwardly diverging relation to one another, as best seen in Figures 1 and 4. One of said leg portions 18 of the arch terminates in an outwardly flared terminal portion 19 of the frame forming strip and which constitutes the frame end which is secured between the handle portions 14. The other end 20 extends downwardly and outwardly at an incline from the lower end of the other leg 18. Said end 20, constituting the outer end of the frame 12, forms a blade having sharpened longitudinal cutting edges 21 which converge outwardly with respect to one another and which merge at their outer ends to form a sharpened point 22 which is bent downwardly relative to the plane of the blade 20, as seen in Figure 1. The legs 18 of the arch portion 16 are provided with inwardly extending journal elements 23 which are located in substantially longitudinal alignment relative to one another and adjacent lower ends of said portions 18.

The peeling implement 10 also includes a blade and gauge holder, designated generally 24, consisting of an outer section 25 and an inner section 26, each of which sections is of elongated substantially arch shaped configuration. Said holder sections 25 and 26 each includes an elongated top portion 27 and 28, respectively. The top portions 27 and 28 of the holder sections 25 and 26, respectively, have depending legs 29 and 30 at the ends thereof. The complementary legs 29 of the outer section 25 are longer than the complementary legs 30 of the inner section 26. Said legs 29 have inturned flanges 29a at the bottom edges thereof. As clearly illustrated, especially in Figures 7 and 8, the flanges 29a and the bottom edges of the end walls 30 of the two holder sections slope upwardly with respect to the top walls 27 and 28 from the open forward side 31 to the open rear side 32 of the holder 24. The inner holder section 26 is sized to be slidably inserted into the outer holder section 25 through the larger open forward side of the latter, and when fully inserted therein, the inner holder section 26 fits snugly in the outer holder section 25 with the bottom edges of its end walls 30 resting upon the inner or upper sides of the flanges 29a. Dimples 27a and 28a are pressed upwardly in complementary portions of the top walls 27 and 28 and the dimple 28a is adapted to fit in the dimple 27a to releasably latch the holder sections in assembled relation as illustrated in the drawing. Said holder sections 25 and 26 are preferably formed of a material corresponding to the material of which the handle 11 is formed and the latch means 27a, 28a, which has been exaggerated in the drawing, protrude only sufficiently from the planes of the walls 27 and 28 to retain the holder sections assembled, and the material of which said sections are formed possesses sufficient resiliency so that the dimple 28a can be displaced out of engagement with the cavity of the dimple 27a when the inner holder section 26 is displaced from right to left relative to the outer holder section 25, as seen in Figure 3.

The end walls 29 of the outer holder section 25 are provided with aligned openings 33 located adjacent the flanges 29a and near the open front 31 of the holder 24. Said openings 33 loosely receive the journals 23 for pivotally mounting the holder 24 in the frame arch 16. The end walls 30 of the inner holder section 26 are provided with aligned openings 34 which are also disposed near the open front of the holder 24 but out of alignment with the openings 33 to provide journals for the ends of an axle 35, which is retained in engagement with said openings 34 by the walls 29, as seen in Figure 4, when the holder sections are assembled. A roller 36 fits loosely between the walls 30 and is journalled on the axle 35.

The bottom edges of the end walls 30 are provided with corresponding notches 37 which are located near the rear side 32 of the holder 24 for receiving therein the ends of a blade 38 having a forwardly facing cutting edge 39 which is disposed below the level of the bottommost portion of the roller 36 and behind said roller 36, as clearly illustrated in Figures 2, 3 and 5.

Assuming that the blade holder 24 containing the gauge roller 36 and blade 38 is mounted in the frame 12, as illustrated in Figures 1 to 4, it will be readily apparent that the peeling implement 10 can be grasped with the right hand by the handle 11 and the blade 38 may then be conveniently utilized for peeling vegetables and fruit. Pressure of the cutting edge 39 of the blade against the fruit will cause the holder 24 to rock relative to the frame 12 about the journals 23 in a counterclockwise direction as seen in Figure 3, so that the cutting edge 39 will be inclined downwardly and forwardly. A bottom portion of the periphery of the roller 36 will contact the vegetable or fruit, not shown, in advance of the cutting edge 39 to limit the depth of the peeling slice executed by said cutting edge. It will also be readily apparent that rollers 36 of different external diameters may be employed for varying the thickness of the cut made by the blade 38. It will also be noted that the roller 36 will swing with the blade 38 when the holder 24 is rocked about its pivots 23 so that the spacing between said roller and the cutting edge 39 will not be varied by the rocking movement of the holder 24. Further, as seen in Figure 1, the axes of the journals 23, roller 36 and blade 38 are disposed at an angle to the axis of the handle 11, such as to enable the implement 10 to be most conveniently held for executing a slicing or paring cut with the blade 38.

The legs 18 of the arch portion 16 are sufficiently resilient to permit said legs to be sprung apart for disengaging the journals 23 from the openings 33 for ready detachment of the holder 24 from the frame 12. When thus detached, the inner holder section 26 can be slidably removed through the open front of the outer holder section 25 so that a blade 38 having a dulled cutting edge 39 may be replaced by a new blade and so that rollers 36 of different diameters may be interchangeably mounted on the axle 35 which is readily removable from the inner holder section 26, when detached from said outer holder section. As clearly illustrated in the drawing, the flanges 29a and the bottom edges of the walls 30 are inclined upwardly and rearwardly so that the open front 31 of the holder is larger vertically, as seen in Figures 3 and 5, than the open rear thereof. This construction prevents the inner section 26 being advanced too far into the outer section 25 when assembled therewith, thus insuring proper disposition of the roller 36 and blade edge 39 relative to the axis 23 about which the holder 24 rocks in the frame 12. Additionally, the inclined disposition of the flanges 29a and notches 37 results in the blade 38 being supported at an incline downwardly and forwardly toward its cutting edge for more effectively executing a slicing cut.

The point 22 of the blade 20 may be employed for removing eyes from potatoes and imperfections from the surface of other fruits and vegetables. Said point 22 may also be engaged in a restricted end of a vegetable or fruit to provide an axis therewith about which the blade 20 may be swung for peeling an end of a vegetable or fruit, utilizing either of the cutting edges 21.

It will also be apparent that the holder 24 may be applied to the frame portions 16 with either end thereof in a forwardmost position and so that the open front 31 of said holder will face to the left, as seen in Figure 3, where the implement is to be held and operated with the right hand, or so that the open front 31 of the blade holder 24 will face to the right, as seen in Figure 5, when said implement 10 is to be grasped and operated with the left hand.

Various modifications and changes are contemplated and may obviously be resorted to, without departing from the spirit or scope of the invention as hereinafter defined by the appended claims.

I claim as my invention:

1. A peeling implement of the character described comprising a handle, a frame attached to and extending from said handle, a blade holder, means connecting said blade holder to said frame, said blade holder having an elongated open forward side, and a blade mounted in said blade holder and having a cutting edge facing toward the open side thereof, said frame including an elongated arch shaped portion, said blade holder being elongated and being disposed in said arch shaped portion and longitudinally thereof, said connecting means detachably and pivotally connecting the blade holder to the frame for rocking movement of the blade holder relative to the frame about an axis disposed longitudinally of the blade holder and frame, gauge means supported by said blade holder forwardly of and spaced from the cutting edge of said blade and comprising an axle mounted in said blade holder and longitudinally thereof and a roller journalled on said axle and having its axis offset from the axis of said connecting means, said blade holder being formed of elongated arch shaped sections including an outer section engaged by said connecting means and an inner section, said sections having end walls, the end walls of said outer section having inturned bottom flanges against which the bottom edges of the end walls of the inner section abut for supporting the inner section in said outer section, said end walls of the inner section having openings for receiving the ends of said axle and downwardly opening notches receiving the ends of said blade, the end walls of said outer section maintaining said axle, roller and blade in correctly applied positions in the blade holder when said blade holder sections are assembled.

2. A peeling implement as in claim 1, said blade holder sections having pressed out dimples in complementary portions thereof detachably interfitting with one another to provide latch means for detachably latching said holder sections in assembled relation.

3. A peeling implement as in claim 2, said end wall flanges and the bottom edges of the end walls of said inner section being inclined upwardly and rearwardly from the open front of said holder, said inner holder section being slidably movable through the open front of the outer holder section for assembling and dismantling the blade holder.

References Cited in the file of this patent

UNITED STATES PATENTS

| 1,445,746 | Burkholder | Feb. 20, 1923 |
| 2,028,915 | Ott | Jan. 28, 1936 |
| 2,645,851 | Ferrin | July 21, 1953 |

FOREIGN PATENTS

| 16,790 | Great Britain | July 19, 1909 |
| 654,169 | Germany | Dec. 13, 1937 |